United States Patent
Schroeder et al.

(10) Patent No.: US 9,482,531 B2
(45) Date of Patent: Nov. 1, 2016

(54) TARGETING DEVICE FOR ELECTRO-OPTICAL MEASURING APPARATUSES

(71) Applicant: LEICA GEOSYSTEMS AG, Heerbrugg (CH)

(72) Inventors: Frank Schroeder, St. Gallen (CH); Canpolat Orman, Dornbirn (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

(21) Appl. No.: 14/919,612

(22) Filed: Oct. 21, 2015

(65) Prior Publication Data

US 2016/0116281 A1 Apr. 28, 2016

(30) Foreign Application Priority Data

Oct. 22, 2014 (EP) .................................. 14189962

(51) Int. Cl.
 *G01C 15/00* (2006.01)
 *G01C 15/02* (2006.01)
 *G01C 3/08* (2006.01)

(52) U.S. Cl.
 CPC ............... *G01C 15/002* (2013.01); *G01C 3/08* (2013.01); *G01C 15/02* (2013.01)

(58) Field of Classification Search
 CPC .... G01C 15/02; G01C 15/002; G01C 15/06; G01C 3/08
 USPC .......... 356/247, 601–623, 138, 154; 33/293, 33/506
 See application file for complete search history.

(56) References Cited

U.S. PATENT DOCUMENTS

| | | | |
|---|---|---|---|
| 2,579,644 A | 12/1951 | Bergman | |
| 3,271,865 A * | 9/1966 | Glidden ................. | G01C 15/06 33/295 |
| 4,549,360 A * | 10/1985 | Allen ..................... | G01B 11/27 33/286 |
| 4,926,563 A * | 5/1990 | Smith .................... | G01C 15/02 33/286 |
| 5,181,719 A * | 1/1993 | Cleveland, III .......... | F41J 1/10 273/409 |
| 5,815,251 A | 9/1998 | Ehbets et al. | |
| 6,813,840 B1 * | 11/2004 | Delmas ................. | G01C 15/02 33/293 |
| 7,042,555 B1 | 5/2006 | Lawson | |
| 9,074,871 B1 * | 7/2015 | Lubeck ................ | G01B 11/026 |

(Continued)

FOREIGN PATENT DOCUMENTS

| | | |
|---|---|---|
| EP | 0 701 702 A1 | 3/1996 |
| EP | 0 738 899 A1 | 10/1996 |

(Continued)

OTHER PUBLICATIONS

European Search Report dated Apr. 16, 2015 as received in Application No. 14189962.5.

*Primary Examiner* — Hoa Pham
(74) *Attorney, Agent, or Firm* — Maschoff Brennan

(57) ABSTRACT

Some embodiments of the invention relate to a targeting device for providing a substitution target of natural shape for the individual-point measurement of surface points with an electro-optical measuring apparatus. In some embodiments, the targeting device may include a carrier plate having at least one insertion seat, and a target panel. In some embodiments, the target panel is insertable into the insertion seat of the carrier plate. In some embodiments, the target panel may include at least one defined placement location for being placed onto the surface point to be measured, and at least one targeting marking.

16 Claims, 7 Drawing Sheets

(56) References Cited

U.S. PATENT DOCUMENTS

| | | |
|---|---|---|
| 2007/0206174 A1 | 9/2007 | Boegel et al. |
| 2012/0130675 A1 | 5/2012 | Schorr et al. |
| 2013/0162469 A1* | 6/2013 | Zogg .................... G01C 15/002 342/357.25 |
| 2013/0326892 A1 | 12/2013 | Schorr |

FOREIGN PATENT DOCUMENTS

| | | |
|---|---|---|
| EP | 1 054 266 A2 | 11/2000 |
| EP | 2 453 205 A1 | 5/2012 |
| EP | 2 458 328 A1 | 5/2012 |
| WO | 2005/083465 A1 | 9/2005 |

\* cited by examiner

TARGETING DEVICE FOR ELECTRO-OPTICAL MEASURING APPARATUSES

FIELD OF THE INVENTION

The present invention relates to a targeting device for electro-optical measuring apparatuses.

BACKGROUND

In the context of artisanal measurement and cutting to size of horizontal workpieces, such as e.g. table tops and kitchen worktops composed of wood, stone or glass, besides conventional analog measuring means, electro-optical measuring apparatuses, in particular distance measuring apparatuses, are also being used more and more often.

Generic electro-optical measuring apparatuses, in particular handheld laser distance measuring apparatuses as described for example in WO 2005/083465, EP 0 738 899 and EP 0 701 702, for optically measuring distances are used nowadays in large numbers for a wide variety of applications, particularly in skilled crafts and trades and in the building and construction industry. They can be used to optically measure distances, for example between a measuring stop of the measuring apparatus and a natural target object (i.e. target object not cooperating with the measuring apparatus), within a distance measurement range of from a few centimeters to 30 meters, for example, with a very high accuracy.

In addition, the electro-optical measuring apparatus can be equipped with an angle determining unit for determining solid angles in relation to a reference coordinate system by means of which three-dimensional coordinates of spatial points can be determined and indicated. For this purpose, such a handheld distance measuring apparatus can comprise a referencing support which can be used to determine angles and changes in alignment of the distance measuring apparatus relative to an external reference object that is stationary with respect to the reference coordinate system. The spatial alignment of the distance measuring apparatus relative to the reference object is detectable by means of goniometers, in particular. Moreover, provision can additionally be made of inclination sensors for determining the alignment in relation to Earth's gravitational field vector.

In one conventional embodiment of such a measuring apparatus, optical beams modulated by means of an optical unit are emitted as transmission beams or measurement light beams toward the target object to be measured. At least some of the measurement light beams are reflected back from the surface region of the natural target object in the direction of the measuring apparatus—in contrast to a target object cooperating with the measuring apparatus, such as a cat's eye or a reflector, for example, the function of which is to completely reflect the measurement beam. By means of the optical unit, beams reflected from said surface region (in particular in a manner spaced apart from the transmission beams) are collected again and converted into an electrical signal by a receiver of the device. Known electro-optical measuring apparatuses and distance measuring methods of this type are based on a measurement of the time of flight of a temporal light pulse or a measurement of the phase shift of a laser beam reflected from the target object. In the time-of-flight measurement, the pulse time of flight from the laser light source to the target object and back to a receiver is measured, as a result of which an extremely short required measurement time can be realized.

Electro-optical measuring apparatuses and distance measuring methods are furthermore based e.g. on measurement of the phase of the reflected laser light and are based on the fact that the phase shift of the reflected laser beam or the modulation thereof relative to the emitted beam is distance-dependent. Since the laser light exhibits a beam diameter, it is always projected and correspondingly reflected in a planar fashion. An average value over the beam cross section is therefore used for the calculation of the distance.

By way of example, if parts of the laser beam impinge on an edge or corner, but other parts impinge on the areas further back, the averaged distance then lies "in the table" and is thus in other words too long. Correspondingly, in the case of the measurement of an angle ("inner edge"), the measured distance is too short since the beams reflected from the areas further toward the front concomitantly influence the average value calculation.

By way of example, if the laser beam impinges on a surface at a very shallow angle, it appears even more planar, e.g. as an elongated ellipse. During correct targeting with the center of the ellipse, although the subsequently measured distance is correct, said center can be discerned only with difficulty by the naked eye and a measurement beam can be manually aligned therewith very poorly. In addition to the measurement errors described above, therefore, another factor is that correct sighting can be made more difficult. It is exactly when such precise technology is used that it is important, however, for the target object to be easily sightable, in order then to be able to be measured exactly.

However, beams directed directly onto edges and corners to be measured that face the measuring apparatus or observer, and onto surfaces at a shallow angle can slightly miss the exact target very easily because they are alignable therewith with very great difficulty. Those additional targeting errors, in the subsequent measurement, can yield deviating distance data which are unacceptable for some applications.

If an edge or corner facing the measuring apparatus or observer is sighted, then—particularly from a relatively far distance—it can be a challenge to align the measurement beam precisely with the point to be measured at the edge or corner (in general: the edge line or the corner point). It is not possible to assess in a simple manner here whether the center of the beam is then exactly on the edge or the corner.

The measurement of an edge not at right angles, in which for example the edge line is not the outermost point of the table edge, is potentially made more difficult in addition. This is because if said outermost point is of interest for the measurement, there is the risk here of said point likewise not being discernible and sightable in a simple manner, as is the case for example for a rounded table edge, the outermost point of which is not readily ascertainable visually. The same applies to a corner which faces the measuring apparatus or observer and the corner vertex of which is intended to be sighted.

Surfaces, edges or corners to be measured that face away from the measuring apparatus or observer are likewise difficult to sight or in some instances not sightable at all, which can occur for example when measuring an averted table top edge which one would like to measure from the opposite table top edge using an electro-optical measuring apparatus.

Apart from the problems described above, moreover, a measurement result would be correct only if the visible and targeted edge also actually represented the table top end which is intended to be measured. This would be the case for a substantially non-rounded edge falling at an angle of at least 90°. However, some edge profiles are not directly measurable because they have, for instance, an edge that is chamfered, oblique (falling angle>90°) or provided with a radius of curvature, such that the outermost point of the table top end is not directly visible and thus not measurable from the measuring apparatus.

The same applies to a corner which faces away from the measuring apparatus or observer and the corner vertex of which is intended to be sighted.

SUMMARY

Therefore, some embodiments of the invention may provide a targeting device which represents a point to be measured and which enables the facilitated and more precise measurement of an edge.

Some embodiments of the invention may provide a targeting device which enables the correct measurement of inner and outer corners.

Some embodiments of the invention may provide a targeting device which enables the precise measurement of oblique, straight, convex, concave and profiled edges from any position.

Some embodiments of the invention may provide a targeting device which enables the correct measurement of the position or height of points on an area.

The invention relates to a targeting device provided for manual operation. In this case, the targeting device is intended to provide a substitution target of natural shape and is provided for the individual-point measurement of surface points with an electro-optical measuring apparatus.

In terms of components, the targeting device according to the invention at least comprises
 a carrier plate having at least one insertion seat, and
 an (actual) target panel,
wherein the target panel is insertable into the insertion seat of the carrier plate.

In this case, the target panel comprises or provides
 at least one defined placement location for being placed onto the surface point to be measured, and
 at least one targeting marking.

According to the invention, then, the at least one targeting marking, with regard to the position thereof on the target panel, is in predefined spatial correlation with the at least one defined placement location exactly in such a way that, in the inserted state of the targeting device placed onto the surface point, such a spatial point—embodied by the targeting marking—is measurable which describes the true position of the surface point with an offset that
 is predefined and
 is includable in the measurement at least partly automatically by the measuring apparatus.

The target panel thus provides a natural, non-cooperating replacement target having reflection properties similar in principle to those of a natural surface (for instance of walls, tables, door frames, window frames, floors, ceilings, etc.), which target—for the case of difficult accessibility of a surface point or a measurement error that is potentially to be expected during the direct measurement of the surface point—that as a replacement can be directly targeted and measured positionally by the measuring apparatus using the measurement laser beam.

The offset of the replacement point then actually measured on the target panel with respect to the desired surface point that is actually to be measured is predefined (that is to say known) and can be included directly in the measurement.

The targeting device therefore comprises a defined zone which is designed for being placed onto a surface. The three-dimensional shapes of the panel and of the carrier plate (in the mated state) are configured and coordinated with one another in such a way that for different typical measurement situations (inner edge measurement, outer edge measurement, etc.), predefined placement zones (that is to say placement areas or placement edges which then also define the specific placement location) are configured for one or a plurality of specific surfaces of the body to be measured. Consequently, preferably, different typical, frequently occurring point measurement situations that are known to be difficult to measure directly are therefore covered, which, according to the invention, can now be measured indirectly better using easily producible and easily handleable means (as it were "remote" by means of the targeting marking present on the target panel).

By way of example, the two components of the targeting device according to the invention can be designed in such a way that, on the one hand, the target panel for transport and/or stowing purposes (for instance in the trouser pocket of the operator) is retractable in the carrier plate (or a projecting frame of the carrier plate) (→the target panel then bears parallel on the carrier plate) and, on the other hand, the target panel (in the operating state) is at right angles to the carrier plate and the carrier plate then additionally serves as a stand/support or placement aid for specific measurement situations.

Suitable measuring apparatuses for which the targeting device according to the invention is provided include here in particular handheld laser distance measuring apparatuses or primarily spatial point measuring apparatuses (in particular for indoor measurements e.g. in the construction sector (building construction/interior finishing/kitchen planning/ kitchen installation/window construction/etc.), as described in terms of basic design for example in EP 2 458 328 A1 or EP 2 453 205 A1. In this case, such measuring apparatuses are actually tailored to the measurement of natural surfaces (that is to say actually indeed precisely not of measuring aids such as, for instance, retroreflectors or other types of especially reflective targets, etc.).

Such a construction measuring apparatus is thus typically designed for measuring and marking natural spatial points on surfaces in the context of construction and/or finishing— in particular interior finishing—of buildings (e.g. kitchen planning/kitchen installation/window construction/pipe installation/staircase construction/electrical system installation/etc.) and can comprise:
 a base,
 an upper part mounted on the base rotatably about a rotation axis,
 a targeting unit mounted on the upper part pivotably about a pivoting axis and providing a distance measuring functionality, said targeting unit having a laser source designed for emitting a laser beam and a laser light detector and
 an evaluation and control unit.
In this case, in such an apparatus it is generally provided that
 a first and a second rotary drive make the upper part and the targeting unit, respectively, drivable and alignable,
 a spatial alignment of the targeting unit relative to the base is detectable by means of two goniometers, and
 the evaluation and control unit is connected to the laser source, the laser light detector and the goniometers in order to assign a detected distance to a corresponding alignment and thus to determine coordinates for surface spatial points.

The targeting device according to the invention therefore preferably comprises two components to be assembled (that is to say to be connected to one another).

The first component is a carrier plate having recesses and passages on the top side for stowing and inserting the second component. The underside of the carrier plate is suitable for level placement onto planar areas. The targeting device can therefore both be placed onto horizontal areas and be fixed to non-horizontal areas, in particular walls.

The second component is a target panel having at least one, in particular four embossed and/or imprinted reference lines as targeting marking. The reference lines are positioned on the target panel in such a way that they—for example in the form of a reticle—represent fixed offset values in relation to the surface on which the targeting device bears. If said offset values are known to the measuring apparatus, then the measuring apparatus, by taking account of said offset values, can automatically determine the point that is actually to be measured. This results in an error-free 3D coordinate despite originally unfavorable measurement circumstances. The target panel is designed in such a way that with at least one, preferably three, of its four face-side ends it is insertable in each case into the carrier plate with an accurate fit and in the process at least partly penetrates through the carrier plate. Said face-side ends have extensions having an edge length that is less than the basic edge length of the target panel. The resultant shoulderlike extensions which delimit the insertion of the target panel into the carrier plate in terms of length are dimensionally coordinated with the reference lines in this case.

That part of the target panel which is pushed through and possibly protrudes again on the other side is used for aligning and/or placing the targeting device on specific surface points or corners and edges.

At least one part of the target panel—preferably one of the parts of the target panel that are pushed through and protrude on the other side of the carrier plate—is in this case out of line or offset orthogonally with respect to the target panel plane having reference lines in such a way that when the targeting device is placed onto and aligned with a corner or edge, at least one sightable point on the reference line lies in the plane of the placement contact between target panel and corner or edge.

The two components have at least five functional assembly states. In the first assembly state, the target panel is introduced flat into the carrier plate and clamped in reversibly by means of a snap-action lug, for example, in order to stow it there in a space-saving manner and in a manner protected against dust. In the four further assembly states set up for the actual targeting and measurement, the target panel is inserted into the carrier plate in each case differently by means of one of its face-side ends, such that the target panel is upright, wherein each of said four assembly states enables at least one measurement mode. These different measurement modes serve for managing different combinations of measurement conditions:

The point to be measured lies on a surface, edge or corner.
The point to be measured lies at a location which faces or faces away from the measuring apparatus.

The targeting device can also be embodied in an integral fashion, as a result of which its usability is limited to a number of measurement modes and the space-saving assembly state is invalid.

By way of example, plastics or else metals (primarily light metals) are selectable as materials for the components of the targeting device—depending on the demands with regard to robustness.

BRIEF DESCRIPTION OF THE DRAWINGS

The targeting device according to the invention is described or explained in greater detail purely by way of example below on the basis of exemplary embodiments illustrated schematically in the drawing. Specifically:

FIG. 8 shows a measuring apparatus handheld by a user during measurement of a table angle by means of a targeting marking on the targeting device in the measurement mode in accordance with FIG. 4a;

DETAILED DESCRIPTION

Figure 1:
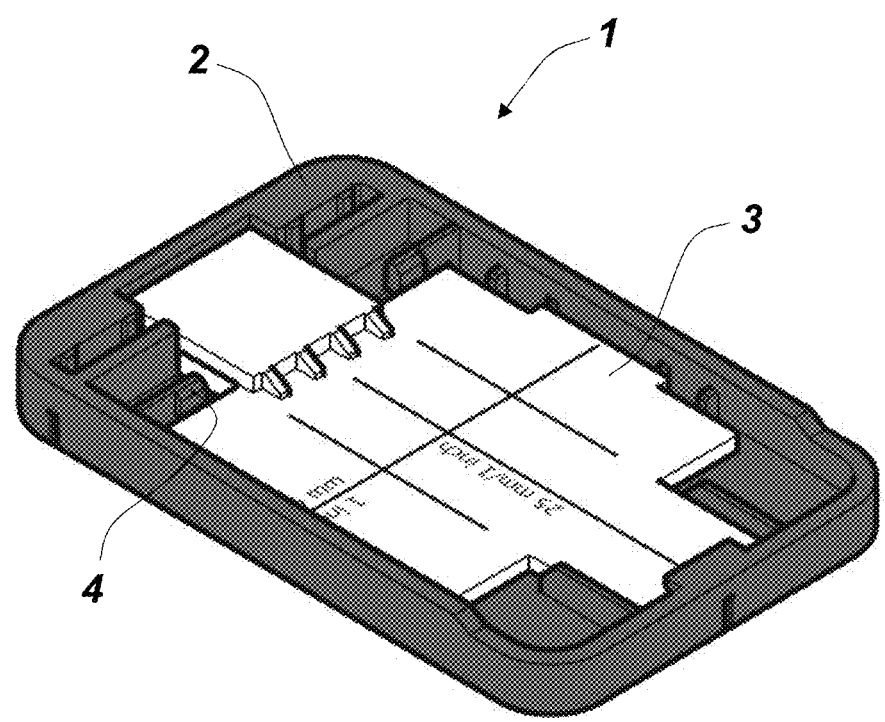
FIG. 1 shows the targeting device in a first assembly state for stowing the target panel in the carrier plate.

FIG. 1 shows a first assembly state of the targeting device 1. The carrier plate 2 is shaped in such a way that the target panel 3 has space therein with an accurate fit and can latch in place with the aid of two snap-action lugs 4. By virtue of this stowing, the targeting device is very compact and can be accommodated by the user for example in a trouser pocket. If the targeting device is required again, the desired set-up in accordance with the following figures is possible with a few movements of the hand.

Figure 2:
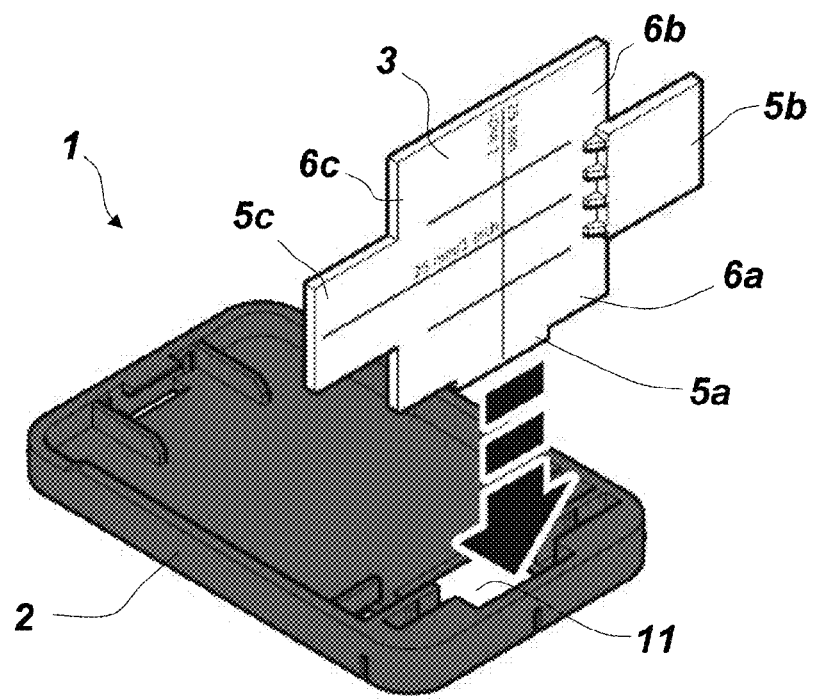
FIG. 2 shows the insertion movement of the target panel into the carrier plate for providing a second assembly state.

FIG. 2 shows the assembly mechanism for a second assembly state of the targeting device 1. The way in which the target panel 3 is inserted upright into the insertion seat 11 of the carrier plate 2 is shown here. For fitting therein, the target panel 3 comprises for this purpose an insertion extension 5a having a length precisely such that it bears closely on the surface after insertion jointly with the carrier plate 2.

The length of the insertion extension 5a is delimited for this purpose by shoulder extensions 6a that bear on a stop in the insertion seat 11. However, the shaping of the insertion extensions 5a, 5b, 5c and shoulder extensions 6a, 6b, 6c is primarily fashioned in such a way that the target panel 3 can always be inserted into the carrier plate 2 correctly and unambiguously in order to avoid incorrect operation on the part of the user and measurement errors associated therewith.

In order to carry out a measurement therefore
the target panel is inserted into the insertion seat,
the targeting device is manually positioned and aligned by the placement of the placement location (that is to say e.g. the insertion extension, for instance) onto the surface point, and
the targeting marking is targeted with the measuring apparatus.

Various measurement modes and the assembly states required therefor will be elucidated purely by way of example below on the basis of a table top in FIG. 3 to FIG. 5b.

Figure 3:
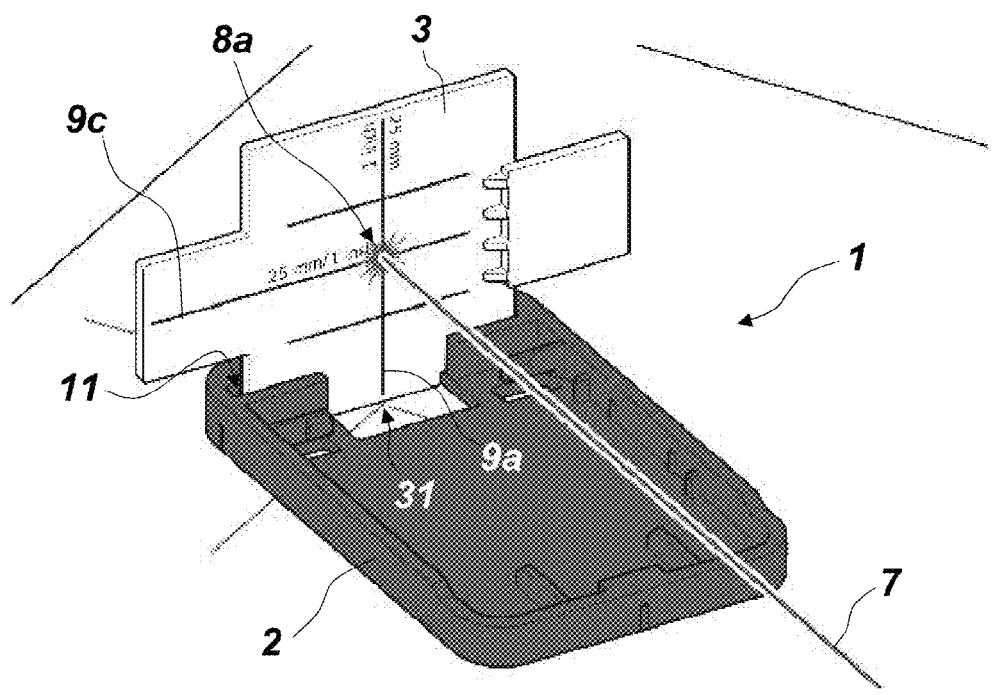
FIG. 3 shows the targeting device in a third assembly state and an associated exemplary measurement mode on a table top surface.

FIG. 3 shows a third assembly state of the targeting device 1. This state differs from the second assembly state only in so far as the target panel 3 is inserted into the insertion seat 11 in a manner rotated by 180° about the vertical axis. This assembly state may become necessary, depending on from what position what location 31 on a surface is intended to be measured. If said location 31 is situated in the vicinity of a plate margin, for example, and said plate margin faces away from the measuring apparatus, then the assembly state shown in FIG. 3 is required for this measurement mode. By contrast, if the plate margin faced the measuring apparatus, the assembly state from FIG. 2 would become necessary for this measurement mode.

With the face side of the insertion extension 5a placed onto the table, the targeting device 1 is aligned with the point 31 to be measured at the base of the carrier plate with the aid of the center marking 9a. In this case, the target panel 3 need not necessarily touch the surface having the point 31 to be measured, but rather can e.g. also be separated from the surface by an air gap as long as the point to be measured can be indicated accurately enough by eye using the center marking 9a. In addition, the targeting device 1 should optimally be frontally opposite the measuring apparatus with that side of the target panel 3 which has the targeting marking 8a. With the measurement beam 7, the targeting marking 8a—or else, with the height difference being correspondingly taken into account, some other targeting marking (8b,8c)—can then be sighted and measured.

Figure 4A:
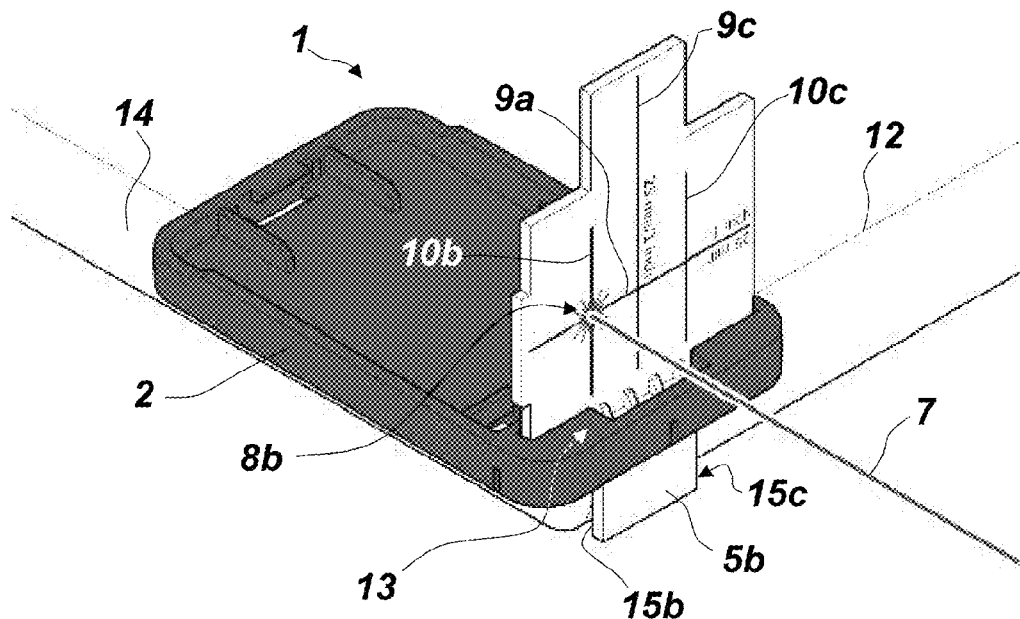
FIG. 4a shows the targeting device in a fourth assembly state and an associated first exemplary measurement mode at a table top edge.
Figure 4B:
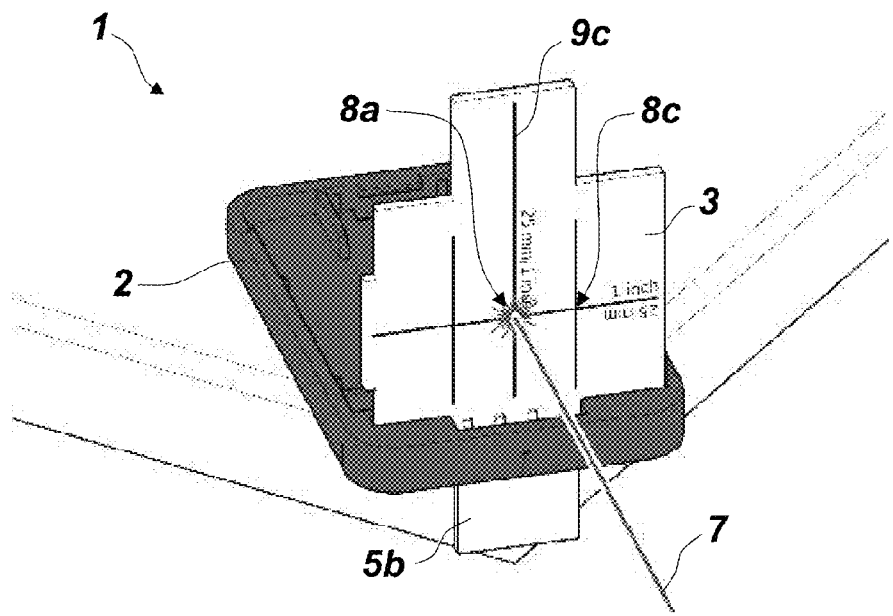
FIG. 4b shows the targeting device in the fourth assembly state and an associated second exemplary measurement mode at a table top corner.

FIGS. 4a and 4b show a fourth assembly state of the targeting device 1. This assembly state is required for the measurement of edges or corners that are situated at a position facing the measuring apparatus. This time a further insertion extension 5b of the target panel 3 is inserted into the same insertion seat 11 incorporated into the carrier plate 2, said further insertion extension being longer because it functions as a stop or as a placement location for the table edge 12. In addition, the insertion extension 5b is offset with respect to the plane of the targeting marking 8b in such a way that the rear side of the insertion extension 5b, that is to say the placement location of the target panel 3, lies in one plane with the targeting marking 8b. Once again the shoulder extensions 6b (hidden in the insertion seat 11 in this view) delimit the insertion in terms of length and in this case ensure that an exact height relation between the targeting marking 8b and the table edge 12 or table corner 13 can be produced. The side marking 10b which intersects the center marking 9a and thus establishes the targeting marking 8b is in alignment exactly with the insertion extension edge 15b, with the result that the lateral relation with respect to the stop thus implemented is ensured. Accordingly, the side marking 10c is a "representative" of the lateral position of the insertion extension edge 15c.

The measurement mode shown in FIG. 4a is useful, in particular, for the measurement of a table corner 13 facing the measuring apparatus. For this purpose, the rear side of the insertion extension 5b is placed at the table edge 12, and
the targeting device 1 is aligned with the aid of the insertion extension edge 15b on the end face 14—situated "around the corner"—of the table top or directly on the corner point 13.

As a result, with unambiguous referencing by means of a fixed, perpendicular distance offset (25 mm in the example), which is ideally already known to the measuring apparatus for taking into account automatically, the targeting marking 8b can be sighted and measured with the measurement beam 7.

FIG. 4b shows a measurement mode in which the fourth assembly state is likewise used. A table corner 13 is also measured here, but from a different perspective. For this purpose, the rear side of the insertion extension 5b is placed on the table corner and the targeting device 1 is aligned on the table corner 13 with the aid of a center marking 9b (visible in FIG. 5a) situated on the rear side of the insertion extension 5b at the base of the carrier plate, and
the targeting device 1 is aligned by rotation around the table corner 13 in such a way that the measurement beam 7 directed onto the target panel 3 impinges as far as possible orthogonally.

The center marking 9b therefore simultaneously serves as placement location and as alignment aid. As a result, once again with unambiguous referencing by means of a fixed, perpendicular distance offset (25 mm in the example), which is ideally already known to the measuring apparatus for taking into account automatically, the targeting marking 8a can be sighted and measured with the measurement beam 7. The center markings 9b and 9c are in alignment with one another, for which reason the targeting marking 8a situated on the center marking 9c yields a defined reference with respect to the corner point 13 to be measured.

Figure 5A:
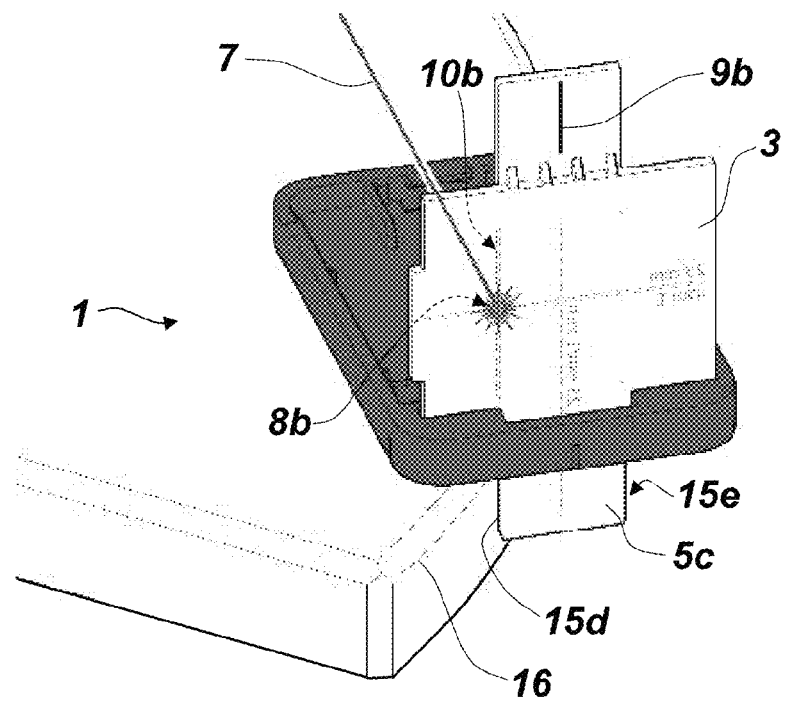
FIG. 5a shows the targeting device in a fifth assembly state and an associated first exemplary measurement mode at a rounded table top edge.
Figure 5B:
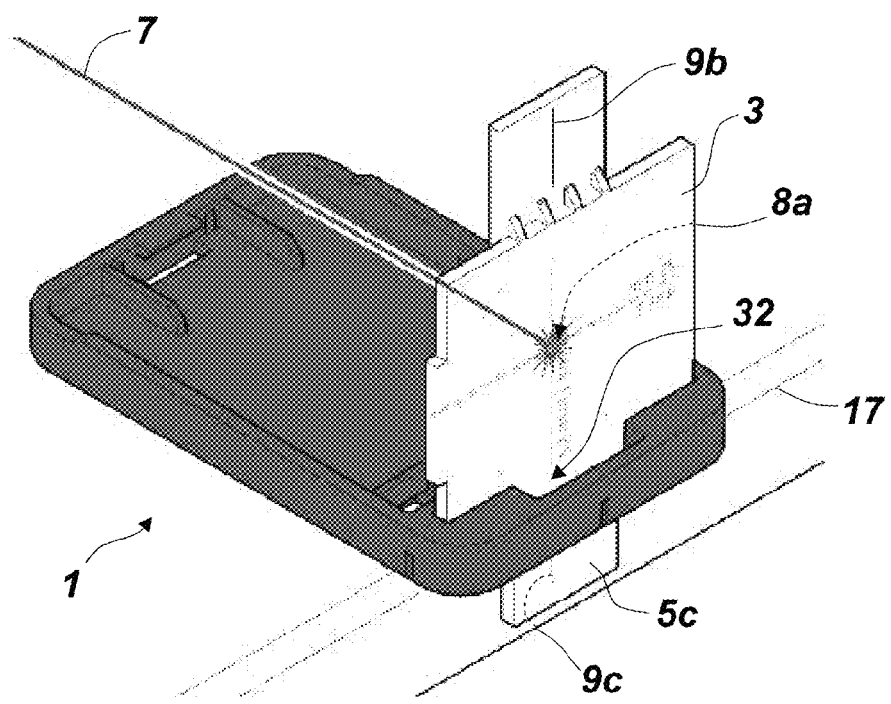
FIG. 5b shows the targeting device in the fifth assembly state and an associated second exemplary measurement mode at a table top edge.

FIGS. 5a and 5b show a fifth assembly state of the targeting device 1. This assembly state is likewise required for the measurement of edges or corners situated at a position facing away from the measuring apparatus. This time a further insertion extension 5c, "passing straight through" relative to the plane of the targeting markings, of the target panel 3 is inserted into the same provided insertion seat 11 of the carrier plate 2, said insertion extension likewise functioning as a stop or as a placement location for the table edge 16 and preferably being opposite the insertion extension 5b from FIGS. 4a and 4b. This affords the advantage that the targeting markings can be used for this measurement mode as well. The front side of the insertion extension 5c lies in one plane with the targeting markings. Once again, shoulder extensions 6c delimit the insertion in terms of length and simultaneously ensure that an exact relation between the targeting markings and the table edge 16 or a table corner can be produced.

The measurement mode shown in FIG. 5a is particularly useful for the measurement of a table edge facing away from the measuring apparatus, in particular for the measurement of a specific point on a non-straight, e.g. curved, edge 16.

The measurement here takes place from a perspective that is not perpendicular to the edge (or to the edge tangent at the point to be measured), but rather from an oblique perspective. For this purpose, the insertion extension edge 15d is placed on the table edge 16 in such a way that it points, if appropriate, at a point to be measured on the edge 16, and the targeting device 1 is aligned by rotation around the insertion extension edge 15d in such a way that the measurement beam 7 directed onto the target panel 3 impinges as far as possible orthogonally.

As a result, once again with unambiguous referencing by means of a defined, perpendicular distance offset (25 mm in the example), which is ideally already known to the measuring apparatus for taking into account automatically, the targeting marking 8b can be sighted and measured with the measurement beam 7. The side marking 10b which intersects the center marking 9a and thus establishes the targeting marking 8b is in alignment exactly with the insertion extension edge 15d, with the result that the lateral relation with respect to the stop thus implemented is ensured. Accordingly, the side marking 10c is a "representative" of the lateral position of the insertion extension edge 15e, which can likewise be used as a placement location.

FIG. 5b shows a measurement mode in which the fifth assembly state is likewise used. Here a location 32 on a straight table edge 17 is measured, but this time from a perspective perpendicular to the table edge 17. For this purpose, the front side—having the center marking 9c—of the insertion extension 5c is placed on the table corner 17, and if appropriate the targeting device 1, with the aid of the center marking 9c that is at least partly visible at the base of the carrier plate, is aligned on a specific point 32 to be measured on the table edge 17.

As a result, once again with unambiguous referencing by means of a fixed, perpendicular distance offset (25 mm in the example), which is ideally already known to the measuring apparatus for taking into account automatically, the targeting marking 8a can be sighted and measured with the measurement beam 7. If the intention is to measure merely the distance to the edge, rather than a specific point on the edge, then a different targeting marking or an arbitrary location on the target panel 3 can be sighted.

Figure 6A:
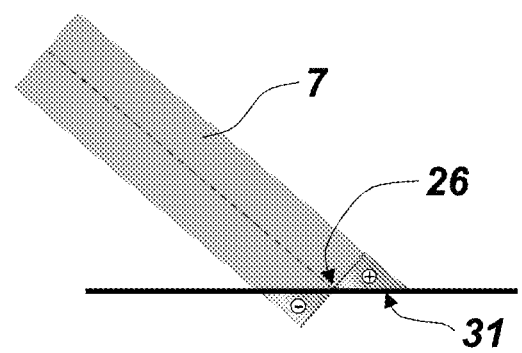
FIG. 6a shows the measurement beam impinging obliquely on a surface in side view and the averaging over its cross section.
Figure 6B:
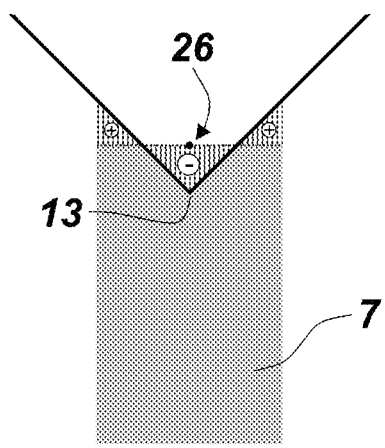
FIG. 6b shows the measurement beam impinging on an edge or corner in plan view, the averaging over its cross section and the measurement inaccuracy that arises here.
Figure 6C:
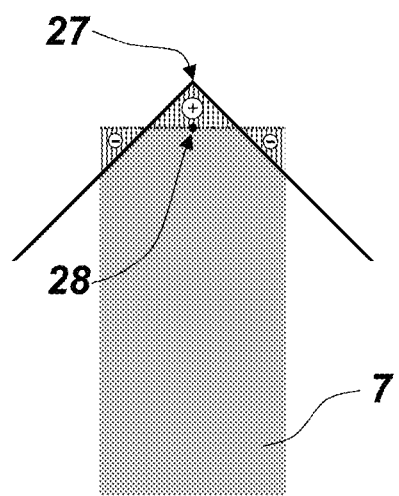
FIG. 6c shows the measurement beam impinging on an angle in plan view, the averaging over its cross section and the measurement inaccuracy that arises here.

FIGS. 6a to 6c show the problems that can be solved by the targeting device according to the invention.

FIG. 6a shows the measurement beam 7 upon impinging on a surface in side view. The measured point 26 is always situated at the center of the measurement beam 7 because the differences between the front light rays, which impinge on the surface and are reflected earlier, and the rear light rays, which impinge on the surface and are reflected later, mutually cancel one another out on the basis of averaging. Consequently, the location 31 to be measured on the surface must be sighted exactly with the center of the measurement beam. This can lead to the deviation shown in FIG. 6a. Although the measurement beam 7 "covers" the location 31, a measurement deviation arises.

FIG. 6b shows the deviation between the corner point 13 actually to be measured (this could also be an edge point) and the actually measured point 26, which is ascertained as too far away on account of the averaging of all the reflections generated by the measurement beam 7.

FIG. 6c shows the deviation between the angle point 27 actually to be measured ("inner" edge or corner) and the actually measured point 28, which is ascertained as too far away on account of the averaging of all the reflections generated by the measurement beam 7.

Figure 7B:
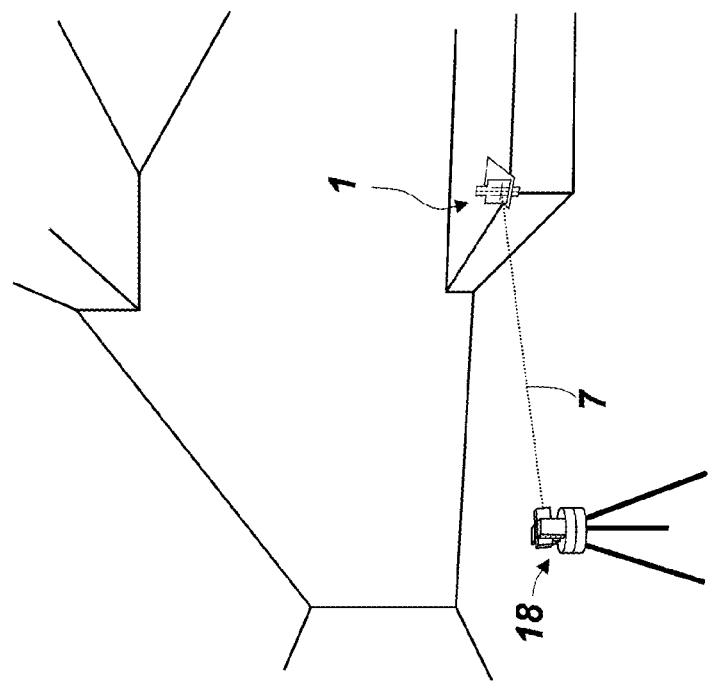
FIG. 7b shows the measuring apparatus during measurement of a corner in a room by means of a targeting marking on the targeting device in the measurement mode in accordance with FIG. 4b.
Figure 7A:
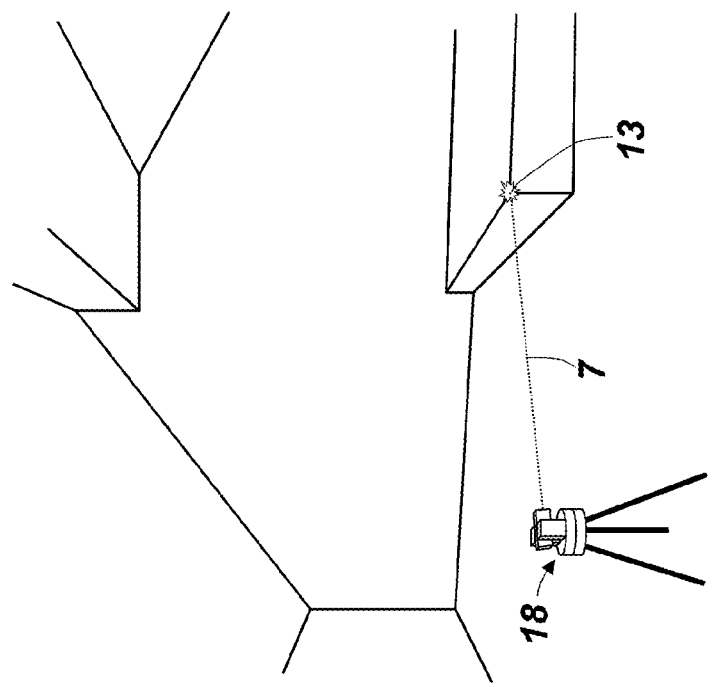
FIG. 7a shows a measuring apparatus during measurement of a corner in a room.

FIGS. 7a and 7b show a further exemplary application of the targeting device 1 in a room. The measurement of a room corner 13 can be facilitated here with the aid of the targeting device 1 in accordance with FIG. 4b.

Figure 8:
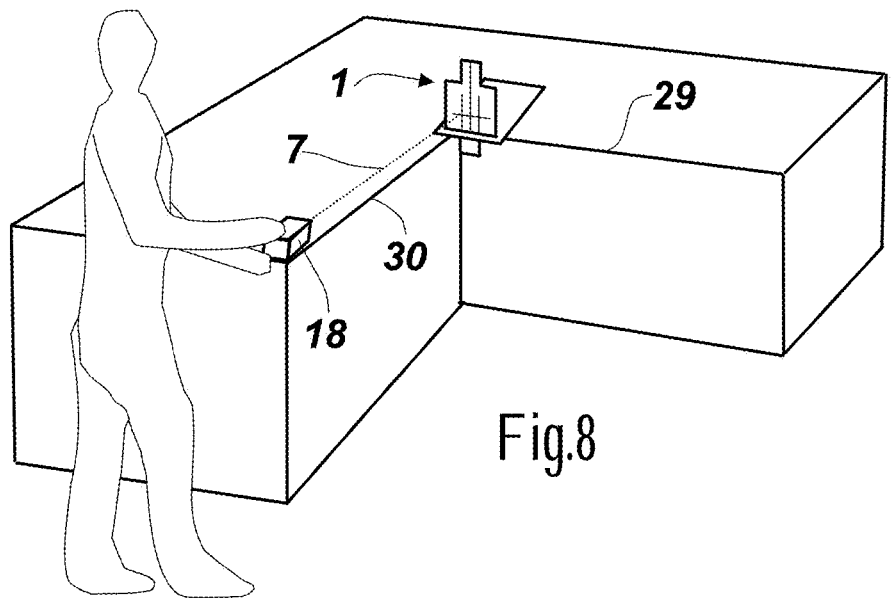

FIG. 8 shows an exemplary application with respect to the principle shown in FIG. 4a or 6c. For this purpose, the rear side of the insertion extension 5b is placed on the table edge 29, and the targeting device 1 is aligned with the aid of the left insertion extension edge 15b on the edge 30 situated "around the corner".

The targeting marking 8b can then be sighted and measured, for example by means of a measuring apparatus 18 handheld by the user.

Figure 9:
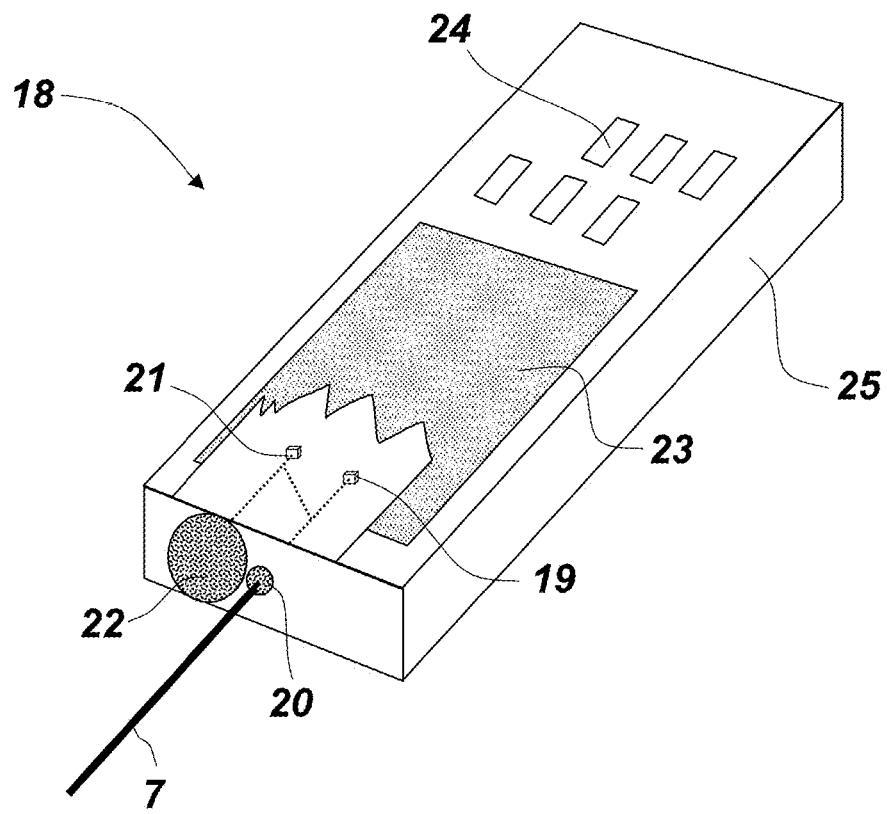
FIG. 9 shows a handheld electro-optical laser measuring apparatus suitable in particular for sighting and measurement with the targeting device according to the invention.

FIG. 9 shows an electro-optical measuring apparatus embodied as a handheld laser distance measuring apparatus. This measuring apparatus comprises a housing 25 and actuating elements 24 for switching the distance measuring apparatus on and off and for starting and configuring a measurement process. Besides the actuating elements, the measuring apparatus has a display 23 for representing measurement results and indications of the apparatus status. As indicated schematically and in principle, the apparatus comprises a transmission path having a transmitter 19 for emitting optical measurement beams 7 and an exit window 20 therefor, and a reception path having a receiver 21 and a receiving optical unit 22.

Distances are measured according to principles known from the prior art, such as e.g. the pulse time-of-flight or phase comparison principle.

The laser distance measuring apparatus can additionally have further components or functions that are known from and routinely implemented in the prior art.

It goes without saying that these illustrated figures only illustrate possible exemplary embodiments schematically. The various approaches can likewise be combined with one another and with methods from the prior art.

What is claimed is:

1. A targeting device for providing a substitution target of natural shape for the individual-point measurement of surface points with an electro-optical measuring apparatus, the targeting device comprising:

a carrier plate having at least one insertion seat; and a target panel having:

at least one defined placement location for being placed onto the surface point to be measured, and at least one targeting marking;

wherein the target panel is insertable into the insertion seat of the carrier plate, and wherein the at least one targeting marking, with regard to the position thereof on the target panel, is in predefined spatial correlation with the at least one defined placement location in such a way that, in the inserted state of the targeting device placed onto the surface point, such a spatial point—embodied by the targeting marking—is measurable which describes the true position of the surface point with an offset that is predefined and is includable in the measurement at least partly automatically by the measuring apparatus.

2. The targeting device according to claim 1, wherein the target panel comprises:

at least one insertion extension forming the at least one placement location or a plurality of placement locations, and shoulder extensions adjacent to the at least one insertion extension, such that the target panel is insertable into the insertion seat of the carrier plate with the aid of the at least one insertion extension and in a manner delimited by the associated shoulder extensions.

3. The targeting device according to claim 1, wherein the target panel comprises at least one non-centrally positioned side marking and at least one centrally positioned center marking and the targeting marking is formed by the at least one side marking which intersects the at least one center marking.

4. The targeting device according to claim 3, wherein the centrally positioned center marking is positioned centrally on the at least one insertion extension.

5. The targeting device according to claim 1, wherein the target panel comprises at least one non-centrally positioned side marking and at least one centrally positioned center marking and the targeting marking is formed by two intersecting center markings.

6. The targeting device according to claim 1, wherein:
the at least one insertion extension has at least one insertion extension edge which leads from the end side to the shoulder extensions and whose length delimits the insertion travel in a defined manner.

7. The targeting device according to claim 6, wherein:
the at least one insertion extension edge, with the at least one targeting marking, is correlated with regard to its position.

8. The targeting device according to claim 6, wherein the insertion extension edge lies in one plane.

9. The targeting device according to claim 1, wherein:
the at least one insertion extension edge, with the at least one side marking, is correlated with regard to its position and is in alignment.

10. The targeting device according to claim 1, wherein:
the at least one insertion extension, after insertion of the target panel into the insertion seat at the carrier plate base with the aid of the center marking situated on the insertion extension, is usable for placement of the targeting device on surface points.

11. The targeting device according to claim 1, wherein:
the at least one insertion extension, after insertion of the target panel into the insertion seat at the carrier plate base with the aid of the center marking situated on the insertion extension, is usable for alignment of the targeting device on surface points.

12. The targeting device according to claim 1, wherein:
after insertion of the target panel into the insertion seat, the at least one insertion extension, in a manner delimited by the shoulder extensions, at least partly penetrates into the carrier plate to an extent such that the height distance between carrier plate base and targeting marking is defined and known.

13. The targeting device according to claim 1, wherein:
the insertion extension, after insertion of the target panel into the insertion seat, penetrates through the carrier plate beyond the base thereof and, at said base of the carrier plate with the aid of at least one of its at least one insertion extension edge, is usable for placement of the targeting device on points to be measured at edges and corners.

14. The targeting device according to claim 1, wherein:
the insertion extension, after insertion of the target panel into the insertion seat, penetrates through the carrier plate beyond the base thereof and, at said base of the carrier plate with the aid of at least one of its at least one insertion extension edge, is usable for alignment of the targeting device on points to be measured at edges and corners.

15. The targeting device according to claim 14, wherein:
wherein points not facing the measuring apparatus include hidden points.

16. The targeting device according to claim 1, wherein:
points not facing the measuring apparatus are made measurable by the targeting device by virtue of the latter making available, with the aid of referenced targeting markings, substitution points which, as a result of their predefined offset with respect to the reference plane, allow a highly accurate conclusion to be drawn about the points actually to be measured.

* * * * *